Jan. 24, 1961 E. P. WIGNER ET AL 2,969,311
MEANS FOR PRODUCING PLUTONIUM CHAIN REACTIONS
Filed Oct. 8, 1946
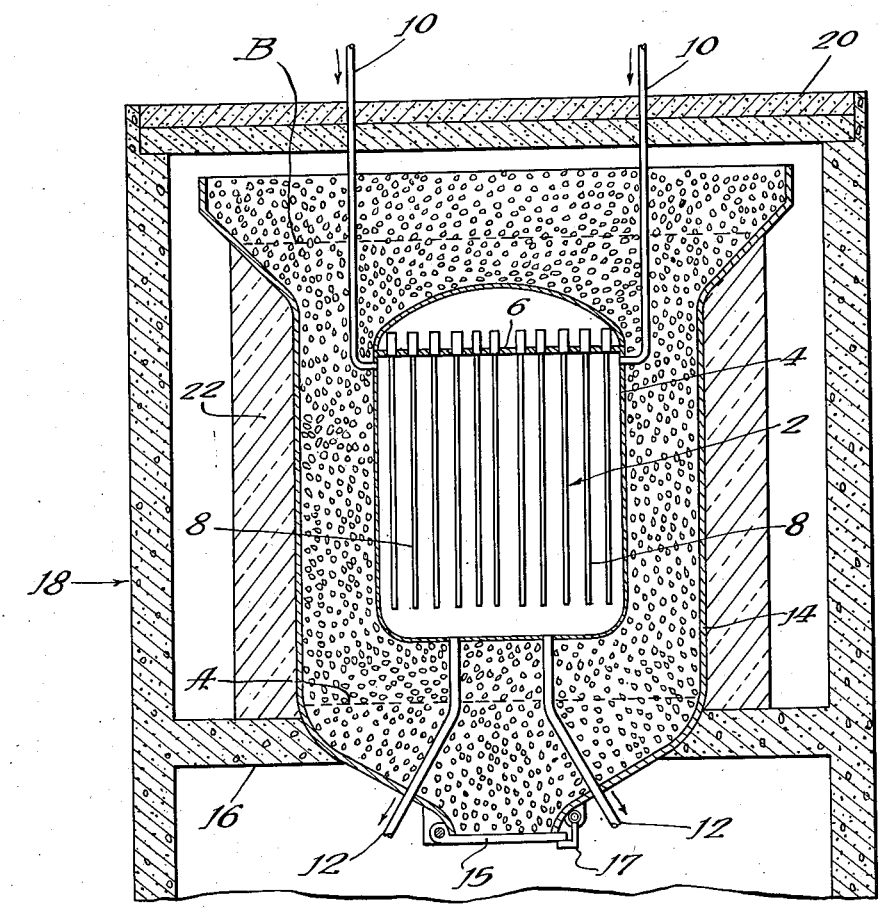
Witness:
Walter L. Schlegel, Jr.
Inventors:
Eugene P. Wigner
Alvin M. Weinberg
By: Robert A. Lavender
Attorney

United States Patent Office 2,969,311
Patented Jan. 24, 1961

2,969,311

MEANS FOR PRODUCING PLUTONIUM CHAIN REACTIONS

Eugene P. Wigner and Alvin M. Weinberg, Oak Ridge, Tenn., assignors to the United States of America as represented by the United States Atomic Energy Commission Filed Oct. 8, 1946, Ser. No. 701,911

2 Claims. (Cl. 204—193.2)

The present invention relates to nuclear physics, and more particularly to a novel method and means for sustaining a nuclear fission chain reaction wherein the average neutron energy is substantially above thermal energy.

A general object of the invention is to design a reactive composition capable of sustaining a chain reaction wherein the average neutron energy is above about 0.3 e.v.

Another object of the invention is to reduce neutron absorption by neutronic impurities in a composition such as above described, by maintaining the average neutron energy at a sufficiently high value to avoid such absorption as hereinafter discussed.

A different object of the invention is to sustain a chain reaction in a composition containing fissionable plutonium, the average neutron energy being above a value of about 0.3 e.v. at which maximum resonance absorption occurs in fissionable plutonium without fission thereof.

Another object of the invention is to provide in a composition such as above-described sufficient neutron moderator to moderate the neutrons in said composition to energies substantially lower than fission energies, thereby substantially reducing the total amount of fissionable material necessary to sustain the chain reaction, inasmuch as the fission cross section of such material is generally greater for neutrons at energy values lower than fission energies.

It has been found that in a neutronic reactor capable of sustaining a nuclear fission chain reaction in an active portion containing neutron moderator and fissionable plutonium ($Pu^{239}$), maximum resonance absorption of neutrons by the fissionable plutonium without fission thereof occurs for neutrons at an energy level of the order of 0.3 e.v., although it will be understood that fissionable plutonium has many other absorpton resonances of less significance. It is desirable, therefore, to avoid maximum resonance absorption of neutrons by fissionable plutonium, as above defined, not only for the purpose of conserving neutrons for the chain reaction and thus increasing the neutron reproduction ratio of the reactive composition but also in order to conserve valuable fissionable material which by nuclear reaction as the result of neutron absorption without fissioning thereof is converted to another isotope (e.g., $Pu^{240}$).

An object of the invention is, therefore, to provide a novel method and means for sustaining a nuclear fission chain reaction by combining with fissionable material such as $Pu^{239}$, preferably of high neutronic purity, a small amount of moderator whereby most of the neutrons in the system cause fission of said material before reaching an energy of 0.3 e.v. and preferably at an energy above 0.5 e.v. It has been found, as stated above, that maximum resonance absorption or capture in $Pu^{239}$ without fission thereof, occurs with a capture to fission ratio of about 0.8 for neutrons at 0.3 e.v. as compared with 0.47 for neutrons of energies higher or lower than 0.3 e.v. By providing a relatively small amount of moderator, such as water, most of the neutrons in the system cause fission of $Pu^{239}$ before being slowed to a value substantially less than 0.5 e.v., thus avoiding the above-mentioned maximum resonance absorption. In the embodiment disclosed herein, $Pu^{239}$ is combined with neutron moderator in an atomic ratio whereby most of the neutrons in the system cause fission of $Pu^{239}$ before reaching the above-mentioned resonance energies therein, and it will be understood by those skilled in the art that other fissionable isotopes, preferably of high neutronic purity, may be substituted for $Pu^{239}$.

It is known that a self-sustaining nuclear fission chain reaction can be obtained in neutronic reactors utilizing natural uranium, as a result of slow neutron fission of the $U^{235}$ content of the natural uranium. In such reactors, discrete bodies of natural uranium of high neutronic purity are disposed, usually in the form of a lattice arrangement of spheres or rods, in a neutron moderator such as graphite, beryllium or heavy water of high neutronic purity, preferably surrounded by a neutron reflector. Neutron absorption in the $U^{238}$ content of the natural uranium during the reaction leads to the production of the transuranic isotope $94^{239}$, known as plutonium (symbol Pu), which is fissionable in much the same manner as $U^{235}$. $Pu^{239}$, or $94^{239}$ is formed in neutronic reactors utilizing natural uranium in accordance with the following process:

$$92^{238} + n \longrightarrow 92^{239} \quad \text{6 m.e.v. of } \gamma \text{ rays, not necessarily all of one frequency.}$$

$$92^{239} \xrightarrow{23 \text{ min.}} 93^{239} + \beta \text{ 1 m.e.b. } \beta, \text{ no } \gamma \text{ rays.}$$

$$93^{239} \xrightarrow{2.3 \text{ day}} 94^{239} + \beta \text{ 600 kv. upper } \beta \text{ energy limit. Also 2 } \gamma \text{ rays, 400 kv. and 270 kv., about } \frac{1}{2} \text{ converted to electrons.}$$

A small portion of the $94^{239}$ produced may also be changed to $94^{240}$ by absorption of neutrons. The neutronic reactors referred to above may be called "isotope converters" in that one fissionable isotope is formed ($94^{239}$) as another fissionable isotope ($U^{235}$) is used up. However, this conversion is not complete, and the natural uranium, which acts to supply both the reaction isotope ($U^{235}$) and the absorption isotope ($U^{238}$), will contain two different fissionable isotopes after the reactor has been started. Certain presently known uranium-graphite reactors have been found to have a conversion factor of .78, $U^{235}$ to $94^{239}$. However, it may be desirable to form other fissionable isotopes in quantity such as, for example, $U^{233}$.

The term "neutronic purity" as used herein has no necessary relation to chemical purity and merely refers to the absence of foreign material having the characteristic of relatively great neutron absorption. In other words, a substance may be said to have high neutronic purity, if the total amount of other material therein is incapable of absorbing a substantial number of neutrons and is thus ineffective to "poison" the nuclear fission chain reaction.

It has been found that by so designing the reactor as to provide a relatively high average neutron velocity of above about 0.3 e.v., absorption of neutrons by such impurities is substantially reduced inasmuch as the capture cross sections thereof are greater for neutrons at energies below said value than for neutrons at energies above said value. Thus it will be understood that although there are various velocity ranges within which resonance absorption occurs in said impurities, maximum absorption generally occurs for neutrons below the above-mentioned value; and the loss of neutrons by absorption in such impurities is substantially decreased by designing the reactor so that the average neutron energy therein is above said value.

Preferably the reactor comprises fissionable material and sufficient neutron moderator to reduce the average neutron velocity to a value lower than about 1,000 e.v., and above about 0.3 e.v. Such an arrangement not only reduces neutron absorption by impurities as above discussed, but also reduces the amount of fissionable material necessary to sustain a chain reaction inasmuch as the fission cross section of such material is generally greater for neutrons below the value of 1,000 e.v. than for neutrons above said value.

To obtain conversion of one fissionable isotope to another in the most efficient manner, it is preferred to utilize a substantially neutronically pure fissionable isotope, such as 94$^{239}$, for the neutronic reaction, and then form the new fissionable isotope U$^{233}$ separately, from a substantially pure non-fissionable isotope, such as thorium$^{232}$ which in turn can be substantially completely converted to the new fissionable isotope U$^{233}$ fully recoverable in high purity and concentration from the thorium. Converters using the fissionable isotope in a liquid medium are disclosed and claimed in the copending application of Ohlinger, Weinberg, Wigner and Young, Serial No. 628,322, filed November 13, 1945, now Patent 2,815,321, dated December 3, 1957.

The plutonium produced by neutronic reactors using natural uranium to support the reaction is useful for many purposes, but it has one outstanding advantage over, for example, the use of U$^{235}$, as it exists in natural uranium. As plutonium is a different element from uranium it can be chemically removed from the irradiated natural uranium, and because of that fact can be obtained in substantially pure form and in high concentrations whereas U$^{235}$ can only be obtained in high concentration or substantially pure form (as far as presently known) by the much more difficult process of isotope separation. U$^{235}$ of high concentration, however, has been used to sustain a neutronic reaction.

In high concentrations of substantially pure form, plutonium can also be used, when properly combined with a neutron moderator, to sustain a slow neutron chain reaction in a neutronic reactor of relatively small size even where the neutron leakage is high. In other words, it can be used as an efficient source of large quantities of neutrons, and the neutrons thus produced can be used to produce another fissionable isotope such as U$^{233}$.

U$^{233}$ can be formed by irradiating non-fissionable thorium (90$^{232}$) with slow neutrons according to the following process:

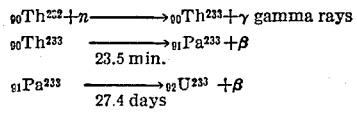

The chemical separation of U$^{233}$ from thorium is readily accomplished with high purity. The fissionable isotope U$^{233}$ will support a chain reaction, and has many desirable qualities. In particular, U$^{233}$ gives a relatively high average neutron yield per fission, the value as presently known being about 2.37–2.4 neutrons per fission (average).

The foregoing and other objects and advantages of the invention will be more fully understood from a consideration of the following specification and the accompanying drawing, which is a diagrammatic illustration partially in central vertical cross section of a structure embodying the invention.

Referring to the drawing, the reactor generally designated 2 is disposed within a cylindrical tank or casing 4 of any suitable neutron permeable material such as aluminum, said tank comprising a wall 6 supporting a plurality of aluminum jacketed plutonium rods 8 within a body of fluid neutron moderator, such as ordinary water, circulated through the tank 4 by inlet pipes 10 and outlet pipes 12. The moderator fluid thus serves the dual function of moderating the neutrons within the reactor and of removing the heat of nuclear reaction therewithin.

The tank 4 is supported within a tank or container 14 of neutron permeable material such as aluminum, said tank being preferably filled to the level indicated at A with a layer of neutron moderator such as beryllium, preferably compressed into a plurality of pellets or pebbles. From level A to the level indicated at B, the tank 14 is filled with thorium containing material such as pebbles or pellets of compressed ThO$_2$, and above the level B, the tank is preferably filled with another layer of neutron moderator such as the above-mentioned BeO pebbles. The material within the tank 14 is loaded into the top thereof and is preferably unloaded by means of a door 15 hinged to the tank 14 adjacent the lower open extremity thereof, said door being normally maintained in a closed position by means of a latch 17.

The tank 14 is supported by a wall 16 of a vault generally designated 18, preferably formed of a material such as concrete adapted to absorb biologically harmful emanations, such as neutrons and alpha, beta and gamma rays emanating from the reactor 2. The vault is closed by a cover 20 of any suitable material such as alternate layers of iron and "Bakelite" adapted to absorb the above-mentioned emanations. It will be understood that the vault 18 and cover 20 form a biological shield around the reactor 2 to protect operating personnel and equipment.

Preferably a cylindrical reflector 22 of neutron moderator such as Be or BeO is disposed around the tank 14 and defines with the moderator pebbles therewithin a neutron reflector substantially enclosing the reactor 2 and associated thorium containing material, thus minimizing leakage of neutrons from the system and affording a maximum conversion rate at which the thorium is converted to U$^{233}$ as above described.

It will be understood by those skilled in the art that the nuclear fission chain reaction within the reactor 2 may be controlled by regulating the level of the fluid moderator therein, or by any other suitable means such as a control rod (not shown) of neutron absorber movable into and out of the reactor to vary the neutron reproduction ratio thereof.

A reactor of the above-described design may be constructed to operate at an average neutron energy above about 0.3 e.v. by providing not more than about 5 molecules of water to each atom of fissionable plutonium. Such a structure in the form of a cylinder may be constructed with a radius of about 19.41 centimeters, a height of about 35.9 centimeters, and a volume of about 42.5 liters. Approximately 176 rods each having a height of about 35.9 centimeters and a diameter of about 1 centimeter are required to provide a total mass of 99.4 kilograms of plutonium, the rods being spaced about 2.59 centimeters from center to center, thus affording a structure in which the water moderator and fissionable plutonium are in the above-mentioned atomic ratio of the order of 5 to 1. The rods are preferably spaced from the water by aluminum coatings about 1 millimeter in thickness. It will be understood that in such a reactor the average neutron energy may be increased by reducing the ratio of water to plutonium, thus necessitating the use of a greater total mass of plutonium inasmuch as the fission cross section thereof tends to decrease as the neutron energy increases, subject to the above-mentioned resonance ranges.

It will be understood that the above-described embodiment of the invention is by way of illustration and not limitation inasmuch as other embodiments of the invention will be readily apparent to those skilled in the art without departing from the spirit of the invention or the scope of the claims.

What is claimed is:

1. A neutronic reactor active portion capable of operating at an energy level of 0.5 to 1000 e.v. comprising discrete bodies of $Pu^{239}$ disposed in a body of water which contains not more than 5 molecules of water to one atom of plutonium, the total amount of $Pu^{239}$ being sufficient to sustain a chain reaction.

2. A neutronic reactor active portion comprising a body of water having therein 176 equally spaced rods of $Pu^{239}$, each of a length of 35.9 centimeters and a diameter of 1 centimeter, the rods being spaced 2.59 centimeters from center to center and having thereon aluminum coatings of 1 millimeter thickness.

References Cited in the file of this patent

FOREIGN PATENTS

| 114,150 | Australia | May 2, 1940 |
| 233,011 | Switzerland | Oct. 2, 1944 |

OTHER REFERENCES

Smyth: "Atomic Energy for Military Purposes," page 20, August 1945.

Smyth: "Atomic Energy for Military Purposes," page 45, August 1945.

Kelly et al.: Physical Review, 73, 1135–9 (1948).